United States Patent
Imai

(10) Patent No.: US 6,908,057 B2
(45) Date of Patent: Jun. 21, 2005

(54) RECORDING TAPE CARTRIDGE

(75) Inventor: Fumihito Imai, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 102 days.

(21) Appl. No.: 10/365,609

(22) Filed: Feb. 13, 2003

(65) Prior Publication Data

US 2003/0168544 A1 Sep. 11, 2003

(30) Foreign Application Priority Data

Feb. 14, 2002 (JP) ........................................ 2002-036207

(51) Int. Cl.$^7$ ............................................ G11B 23/107
(52) U.S. Cl. .................. 242/348.2; 242/348.3
(58) Field of Search .......................... 242/332.4, 348.2, 242/348.3, 532.6, 532, 580; 360/93, 95, 132, 85; 352/235

(56) References Cited

U.S. PATENT DOCUMENTS

| 3,980,254 A | * | 9/1976 | Coon et al. ............... 242/348.2 |
| 4,383,660 A | | 5/1983 | Richard et al. |
| 4,977,474 A | * | 12/1990 | Oishi et al. ............... 242/348.2 |
| 5,465,187 A | * | 11/1995 | Hoge et al. ................. 360/132 |
| 5,883,771 A | * | 3/1999 | Hoerger ...................... 360/132 |
| 6,331,922 B2 | * | 12/2001 | Morita et al. ............... 360/132 |

* cited by examiner

*Primary Examiner*—Kathy Matecki
*Assistant Examiner*—Scott Haugland
(74) *Attorney, Agent, or Firm*—Sughrue Mion, PLLC

(57) ABSTRACT

The instant invention provides a recording tape cartridge in which there is no need for adjustment on the case side with respect to forces for holding and drawing-out a leader block. The tape cartridge comprises: a reel on which a recording tape is wound; a leader block attached to an end of the recording tape; a case for accommodating the reel; and a leader block receiving portion which is provided in the case and in which the leader block is received; wherein the leader block is elastically deformable and is capable of being held at the leader block receiving portion by an elastic restoring force of the leader block itself.

17 Claims, 5 Drawing Sheets

RECORDING TAPE CARTRIDGE

BACKGROUND OF THE INVENTION

1. Field of the Invention

The present invention relates to a recording tape cartridge which rotatably accommodates a single reel onto which a recording tape, such as a magnetic tape or the like, which is used as a recording/playback medium of a computer or the like, is wound.

2. Description of the Related Art

Conventionally, magnetic tape cartridges have been known in which a magnetic tape, which is used as a data recording/playback medium of a computer or the like, is wound on a single reel and the reel is accommodated within a plastic case. A leader member, such as a leader block or a leader pin, for example, is provided at a distal end (free end) of the magnetic tape. A drawing-out means, which is provided at a drive device, pulls out the leader member from the magnetic tape cartridge, so that the magnetic tape fixed to the leader member is wound onto a take-up reel of the drive device.

A reel gear is carved in an annular shape at a center of a bottom surface of the reel which emerges from an opening formed in a bottom surface of the magnetic tape cartridge. Due to a driving gear, which is provided at a rotating shaft of the drive device, meshing with the reel gear, the reel is driven to rotate. Further, due to the reel of the magnetic tape cartridge and the take-up reel of the drive device being rotated synchronously, writing and reading of information on the magnetic tape can be carried out.

Such magnetic tape cartridges have leader members provided at the distal ends of the magnetic tapes, as described above. In the case of a leader block 70, as shown in FIG. 5, an opening 76 of the magnetic tape cartridge can be closed off by the leader block. The leader block 70 has an outer wall surface 72 which is outwardly exposed from the opening 76 and provided with a rear end portion 72B. The leader block also has a front end portion 72A and a concave portion 74 which is next to the front end portion and with which a drawing-out member 60 of a tape drive comes into engagement. By the rear end portion 72B being hooked at a front end portion 82B of a right wall of a case 80 and by the front end portion 72A being hooked at a right end portion 82A of a front wall of the case 80, the leader block 70 can be retained so as to close off the opening 76.

More specifically, the front wall right end portion 82A of the case 80 has a slit 78 formed at an interior thereof by which the right end portion 82A is elastically deformable in a front-back direction of the case 80. Due to such an elastically deformable means formed on the case side, the leader block 70 can be detachably hooked and retained with respect to the case 80. A force of the case 80 for holding the leader block 70 is sufficient to prevent the leader block 70 from easily falling from the case 80 even with the application of shocks due to dropping and the like.

Further, when the opening 76 is closed of by the leader block 70, the magnetic tape T is pulled and held by a predetermined tension in a winding direction of a reel (not shown in the drawings) so as to prevent slack and the like which may occur within the case 80. Therefore, when the leader block 70 is drawn out from the case 80 by the drawing-out member 60 of the tape drive side, some load is applied to the magnetic tape T, even though the reel is driven to rotate. Consequently, it is necessary that a force of the drawing-out member for drawing out the leader block 70 surpasses the load applied to the magnetic tape T and the holding force of the case 80 without the risk of elongation or breakage of the magnetic tape T.

Namely, it is necessary that the leader block 70 is suitably retained by the case 80 when the magnetic tape cartridge is not in use and that the leader block 70 is easily detachable from the case 80 when the magnetic cartridge is in use. Therefore, force-balancing between the drawing-out force exerted by the drawing-out member 60 and the holding force exerted by the case 80 must be appropriately maintained through delicate adjustment. Until now, such an adjustment has been effected by adjusting an elastically deformable means that is formed on the case side or by adjusting an elastic force of the front wall right end portion 82A that is formed with the slit 78.

Generally, cases of magnetic tape cartridges have a variety of mechanisms formed on outer surface portions thereof and are often subjected to modification and the like. If such a means for holding a leader block to a case is provided at the case side in this typical way, a degree of freedom of design of the case is adversely affected such that there are many more constraints on the case structure. Further, since the above-described force-balancing must be realized at the case side, the cost of manufacturing the cases is inevitably increased.

SUMMARY OF THE INVENTION

It is an object of the present invention to provide a recording tape cartridge that can eliminate the aforementioned problems of the prior art.

In order to achieve the object described above, according to a first aspect of the present invention, there is provided a tape cartridge which is insertable at a tape drive, the drive being provided with a drawing-out member which is operably engageable with the tape cartridge at a time of insertion of the tape cartridge and carrying out at least one of reading and writing of data, the tape cartridge comprising: a reel on which a recording tape is wound; a leader block attached to an end of the recording tape; a case for accommodating the reel; and a leader block receiving portion which is provided in the case and in which the leader block is received; wherein the leader block is elastically deformable and is capable of being held at the leader block receiving portion by an elastic restoring force of the leader block itself.

According to a second aspect of the present invention, there is provided a tape drive into which a tape cartridge is removably inserted and which can carry out at least one of reading and writing of data at a time of insertion of the tape cartridge, the tape drive comprising a drawing-out member for drawing-out a recording tape, the drawing-out member being operably engageable with the tape cartridge, wherein the tape cartridge comprises a reel on which the recording tape is wound, a leader block attached to an end of the recording tape, a case for accommodating the reel, and a leader block receiving portion which is provided in the case and in which the leader block is received, and wherein the leader block is elastically deformable and is capable of being held at the leader block receiving portion by an elastic restoring force of the leader block itself.

DESCRIPTION OF THE PREFERRED EMBODIMENT

An embodiment of the present invention will be described in detail below on the basis of the drawings. For the sake of convenience of explanation, a direction of loading a recording tape cartridge into a drive device (the direction of arrow P in FIG. 1) is referred to as a front direction, and other directions of back, left, right, top, and bottom will be specified on the basis of the front direction. Further, a magnetic tape is used as a recording tape, and hereinafter, explanation will be given with regard to a magnetic tape cartridge.

Figure 1:
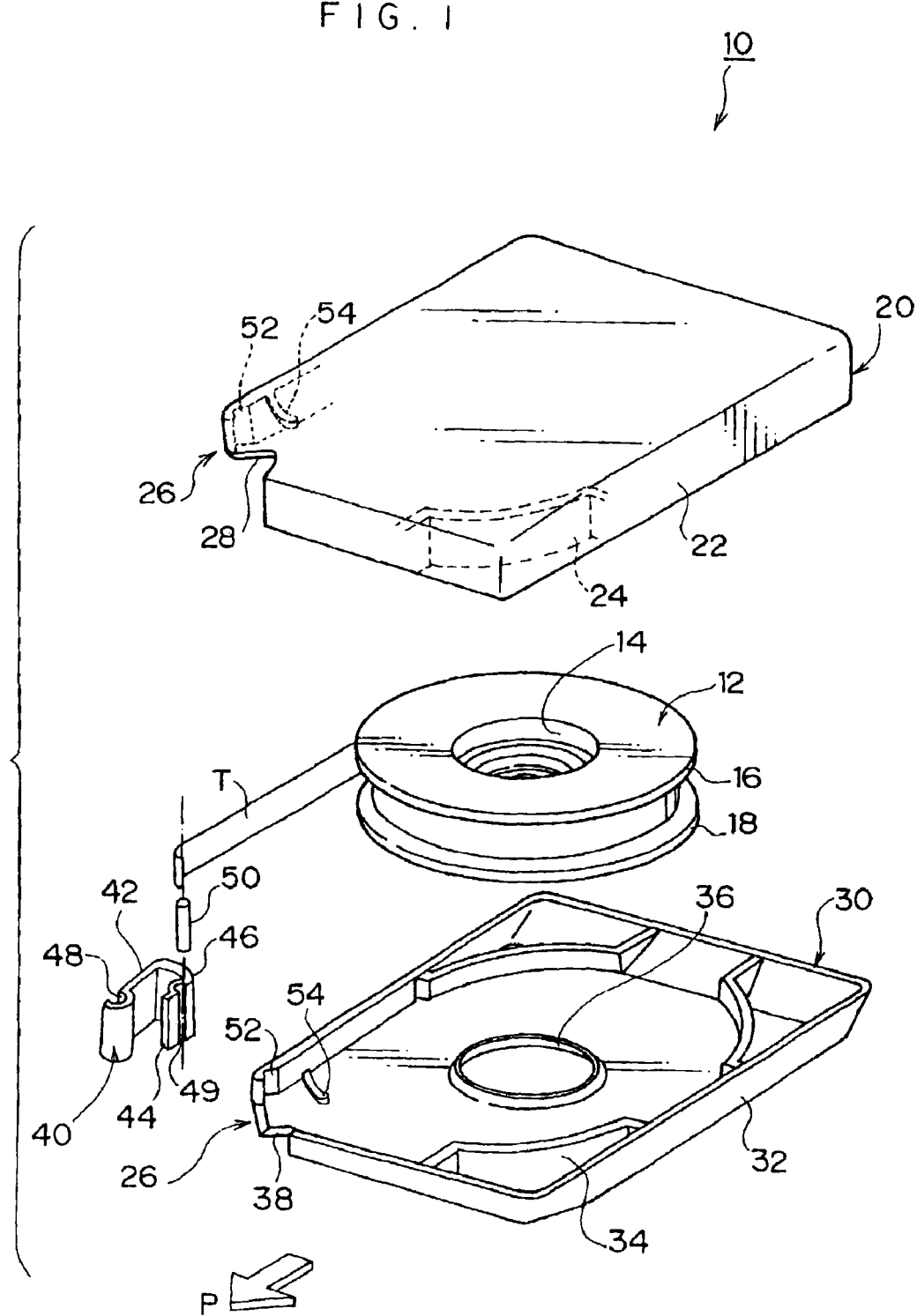
FIG. 1 is an exploded schematic perspective view of a magnetic tape cartridge as seen obliquely from above.

As shown in FIG. 1, a magnetic tape cartridge 10 is formed in the shape of a substantially rectangular box by an upper case 20 and a lower case 30, which are each formed from a synthetic resin, being joined together by ultrasonic welding such that peripheral walls 22 and 32 thereof abut one another. A single reel 12, on which a magnetic tape T serving as an information recording/playback medium is wound, is rotatably accommodated within the magnetic tape cartridge. Specifically, free play-restricting walls 24 and 34, each being semi-cylindrical, are provided protruding at interior surfaces of the upper case 20 and the lower case 30. The reel is accommodated inside the free play-restricting walls 24 and 34.

A circular aperture 36 is formed at a center of the lower case 30. A reel gear (not shown in the drawings), which is formed on a bottom surface of the reel 12 and has an annular shape, is exposed from the circular aperture 36. The reel 12 is structured such that a cylindrical reel hub 14 and a bottom flange portion 18 radially projecting from a periphery of a bottom end of the reel hub 14 are integrally formed from a synthetic resin, and a top flange portion 16 having the same shape as the bottom flange portion 18 is joined by ultrasonic welding or the like to a top end of the reel hub 14. Then, the magnetic tape T is wound around a peripheral surface of the reel hub 14.

An opening 26 is formed at a front-right corner portion of the magnetic tape cartridge 10 by partially cutting away peripheral walls 22 and 32. The opening 26 is for drawing out to an exterior of the magnetic tape cartridge 10 the magnetic tape T wound on the reel 12. When the magnetic tape cartridge 10 is not in use, a leader block 40, which is secured to a distal end of the magnetic tape T, is held at the front-right corner portion, thereby closing off the opening 26.

Figure 5:
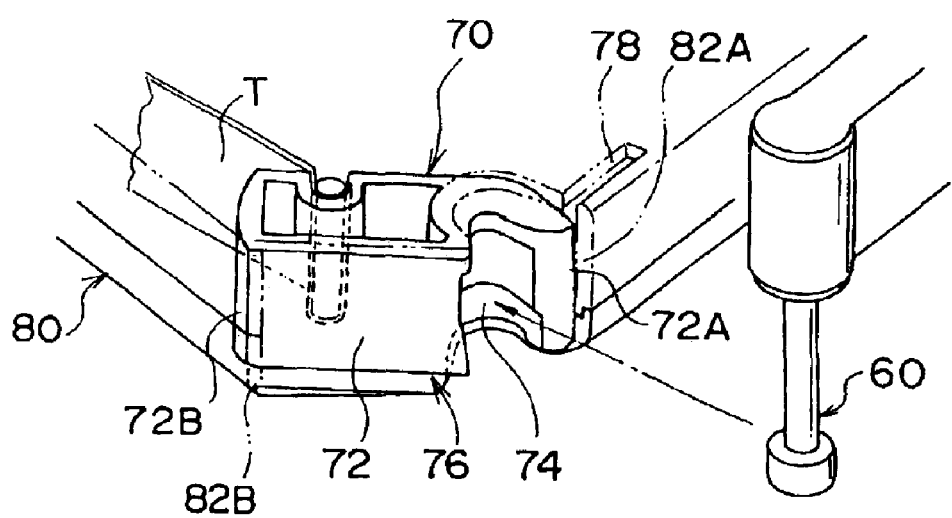
FIG. 5 is a schematic perspective view showing a conventional leader block and a drawing-out member of a drive device.

A curved recess portion 48, which is substantially semi-cylindrical in plan view, is formed at a front end of the leader block 40. Recess portions 28 and 38, which have substantially the same curvature as the curved recess portion 48, are formed at locations of the upper case 20 and the lower case 30 in a vicinity of the opening 26, which correspond to a location of the curved recess portion 48 of the leader block 40 when the opening 26 is closed off by the leader block 40. As a result, a drawing-out member 60 (see FIG. 5) of the drive device for drawing out the leader block 40 is easily insertable into the curved recess portion 48.

That is, the leader block 40 is drawn out from the magnetic tape cartridge 10 by moving the drawing-out member 60, which has been inserted and held in the curved recess portion 48, to a take-up reel (not illustrated) of the drive device. Thereafter, the leader block is fitted into a fit-in portion (not illustrated) that is provided on a reel hub of the take-up reel of the drive device, so that the magnetic tape can be wound around the take-up reel of the drive device.

Next, detailed explanation will be given with regard to the leader block 40 and holding portions for holding thereof, of the upper case 20 and the lower case 30 in the magnetic tape cartridge described above. As shown in FIGS. 1 through 4B, the leader block 40 is formed by deforming a plastic or metal, flat plate to the general shape of a "7", as viewed from below. A longer first arm 42 and a shorter second arm 44 thereof are connected by a connection arm 46. Due to elasticity of the connection arm 46, the first arm 42 and the second arm 44 are elastically deformable in directions along which they move toward and away from one another (the directions being orthogonal to a heightwise direction of the magnetic tape cartridge 10).

That is, the leader block 40 comprises the first arm 42 having an outer wall surface 42A which is exposed from the opening 26 when the leader block 40 is held by the upper case 20 and the lower case 30 so as to close the opening 26, the second arm 44 which is disposed substantially parallel to the first arm 42 and has a length that is shorter than the first arm 42, and the connection arm 46 which connects the first arm 42 and the second arm 44 and is formed in a circular-arc shape as seen in plan view. An outer wall portion 46A of the connection arm 46 constitutes part of an outer peripheral surface of the reel hub of the take-up reel.

Further, the curved recess portion 48 is formed at a front end of the first arm 42, is substantially semi-cylindrical in plan view, and engages the drawing-out member 60 of the drive device. The second arm 44 is provided with a recess portion 49 for securing the magnetic tape T, which recess portion 49 is formed in a circular-arc shape as seen in plan view. Specifically, a substantially columnar pin 50, which is made of elastic material and has a diameter that is equal to or somewhat larger than a diameter of the recess portion 49, is inserted into the recess portion 49 with the magnetic tape T tucked therein such that the leader block 40 is secured to the distal end (free end) of the magnetic tape T.

On the other hand, right wall portions of mutually joined peripheral walls 22, 32 of the upper case 20 and the lower case 30, are integrally formed at front ends thereof with first holding portions 52 for holding a portion of the first arm 42 in the vicinity of a boundary of the connection arm 46. Further, second holding portions 54 for holding a portion of the second arm 44 in the vicinity of another boundary of the connection arm 46 are integrally formed in a projecting manner, having a height less than or equal to a thickness of the bottom flange portion 18, at predetermined positions on inside surfaces of the right wall portions of the upper case 20 and the lower case 30. Side surfaces of the first and second holding portions 52 and 54 serve as abutment surfaces to the first and second arms 42 and 44, respectively. Further, it is preferable to provide the second holding portions 54 continuously with an inner surface of the right wall, as illustrated, in consideration of the strength.

In plan view as shown in FIGS. 3A–3C and 4A and 4B, a distance (spacing) between the first holding portion 52 and the second holding portion 54 is somewhat shorter than a width of the connection arm 46 of the leader block 40 (i.e., the distance between an outer wall of the first arm 42 and an outer wall of the second arm 44). Accordingly, when the leader block 40 is inserted between the first holding portion 52 and the second holding portion 54 while being slightly pressed so as to oppose an elastic force of the connection arm 46, in a direction in which the first arm 42 and the second arm 44 move toward one another, the leader block 40 is secured and held therebetween by the first arm 42 and the second arm 44 respectively pressing on the first holding portion 52 and the second holding portion 54 under a predetermined pressure based on restoring force of the connection arm 46.

Figure 2:
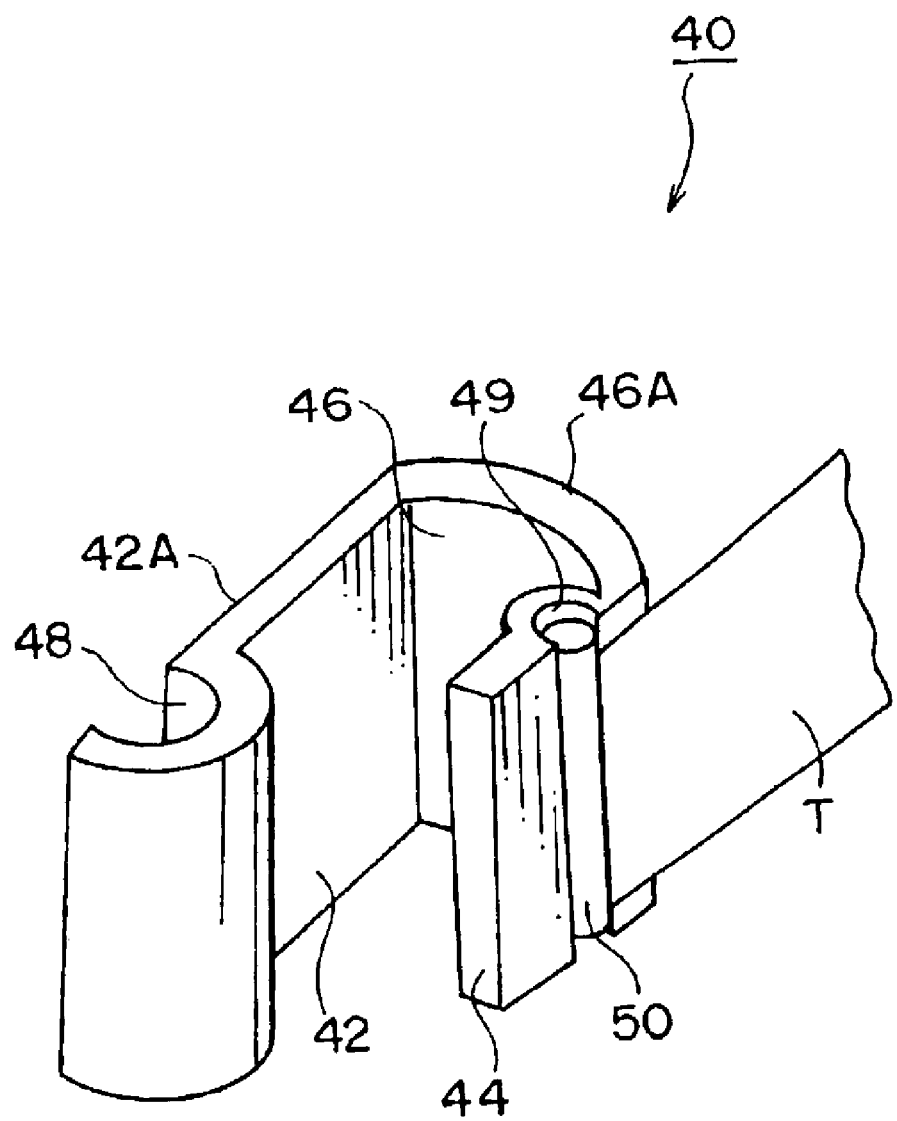
FIG. 2 is a schematic perspective view showing a leader block according to the present invention.

As described above, the height of each of the second holding portions 54 is less than or equal to a thickness of each of the flange portions 16 and 18 of the reel 12, and a height of the leader block 40 is greater than a width of the magnetic tape T (see FIG. 2). As a result, there is no problem in that the magnetic tape would interfere with the second holding portions 54. The leader block 40 is structured such that when the drawing-out member 60 of the drive device elastically deforms the connection arm 46 by pressing the first arm 42 toward the second arm 44 via the curved recess portion 48 to separate the first arm 42 from the first holding portion 52, the leader block 40 can be detached from between the first holding portion 52 and the second holding portion 54.

Load-balance between a holding force exerted by the upper case 20 and the lower case 30 and a pulling-out force exerted by the drawing-out member 60 can be maintained by adjusting an elastic force exerted by the connection arm 46. More specifically, by appropriately establishing a (bending) force to be required at a time when the first arm 42 and the second arm 44 are bent toward one another, a holding force exerted by the upper case 20 and the lower case 30 can be adjusted, and, by appropriately establishing a (bending) force to be generated at a time when the first arm 42 and the second arm 44 are bent so as to move away from one another, a pulling-out force exerted by the drawing-out member 60 can be adjusted.

Figure 3A:
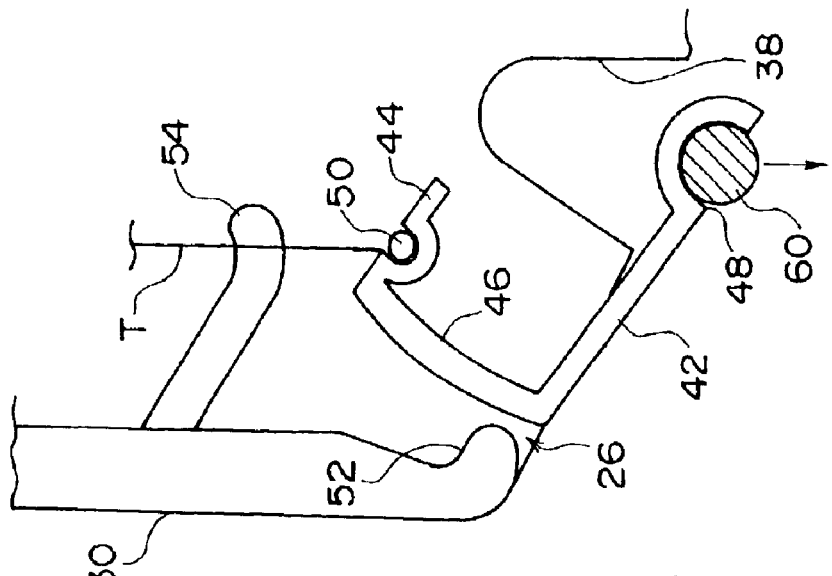
FIGS. 3A, 3B, and 3C are explanatory diagrams of a detaching operation of the leader block according to the present invention.
Figure 3B:
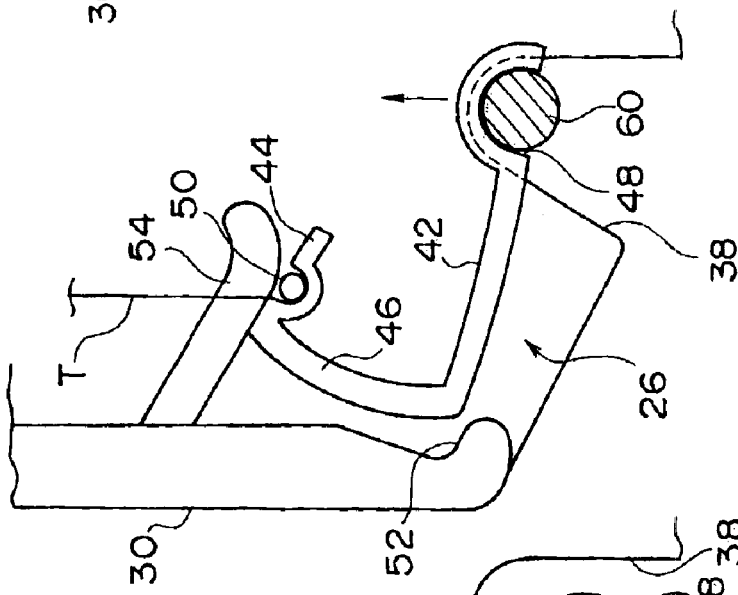
Figure 3C:
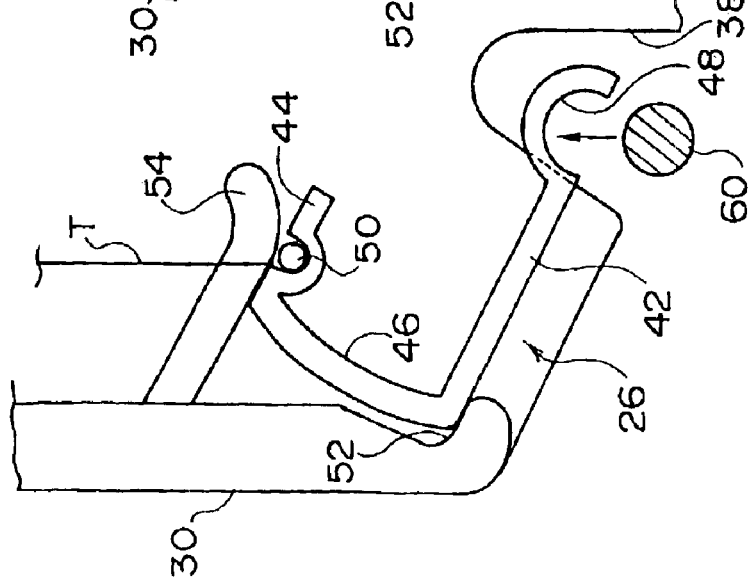

Detaching and attaching operations of the leader block will now be described. When the magnetic tape cartridge 10 is inserted into the drive device, the drawing-out member 60 of the drive device is firstly moved to engage the curved recess portion 48 of the leader block 40 which is hooked and held between the first holding portion 52 and the second holding portion 54 so as to close the opening 26 (see FIG. 3A). Next, as shown in FIG. 3B, the drawing-out member 60 presses and moves the curved recess portion 48 toward the second arm 44, so that the first arm 42 moves toward the second arm 44, while opposing an elastic (restoring) force of the connection arm 46.

At that moment, the first arm 42 separates from the holding portion 52. By maintaining this separated state and by moving the drawing-out member 60 toward the outside (in a direction in which the drawing-out member 60 departs from the opening 26), the second arm 44 can be separated from the second holding portion 54, so that the leader block 40 is detached from between the first holding portion 52 and the second holding portion 54 (see FIG. 3C). As described above, because the force to be required for detaching the leader block from the first and second holding portions via the drawing-out member 60 is appropriately adjusted by establishing an elastic force due to the connection arm 46, problems such as tape breakage or the like can be prevented.

The leader block 40, which has been drawn out through the opening 26 in the manner described above, is then mounted on the take-up reel of the tape drive. The drive device rotates the reel 12 and the take-up reel simultaneously and carries out recording of information onto the magnetic tape T and/or replaying of information that has been recorded on the magnetic tape T.

When the magnetic tape T has been wound back to the reel 12, the leader block 40 is detached from the take-up reel and then disposed so as to again close off the opening 26. Specifically, the leader block 40 is inserted through the opening 26 by the drawing-out member 60 which engages the curved recess portion 48, so that the second arm 44 abuts the second holding portion 54. Then, the first arm 42 is further pressed and moved toward the second arm by the drawing-out member 60 such that the connection arm 46 is bent and deformed (see FIG. 4A).

Figure 4A:
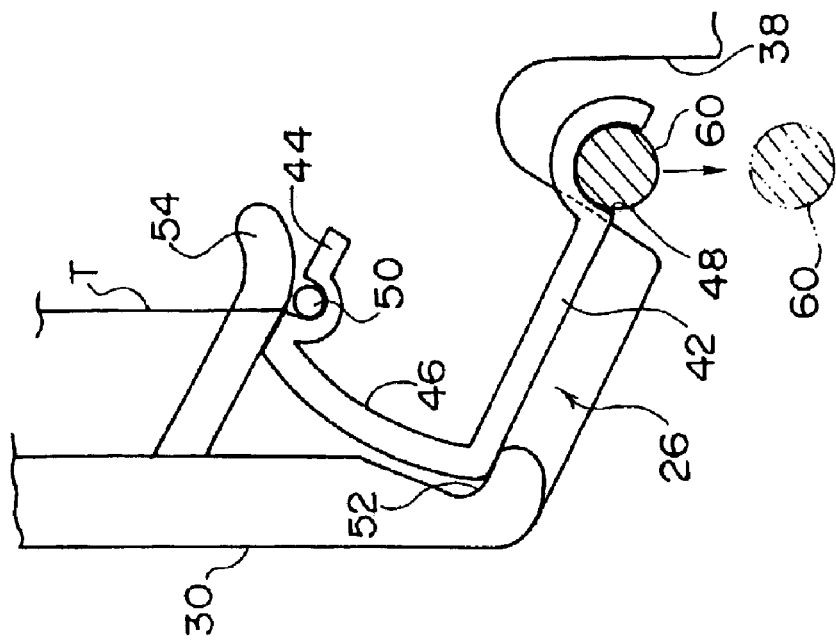
FIGS. 4A and 4B are explanatory diagrams of an attaching operation of the leader block according to the present invention.
Figure 4B:
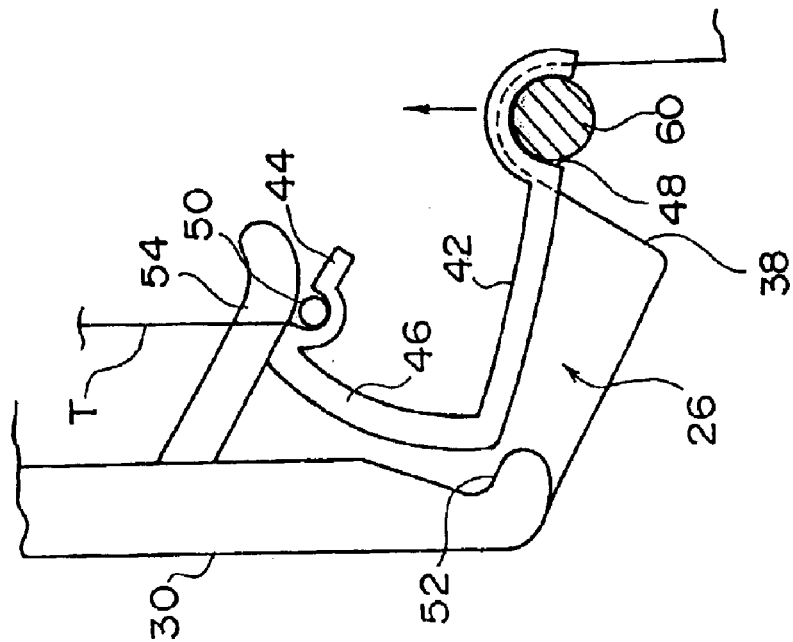

Thereafter, as shown in FIG. 4B, when the drawing-out member 60 is moved in the return direction and detached from the curved recess portion 48, the first arm 42 is moved by a restoring force of the connection arm 46 in a direction in which it moves away from the second arm 44, so that the first arm 42 abuts and presses the first holding portion 52 with a predetermined pressure. In other words, due to an elastic force (a restoring force) of the connection arm 46, the first arm 42 and the second arm 44 press against the first holding portion 52 and the second holding portion 54, respectively, with a predetermined pressure.

Consequently, the leader block 40 is again hooked and held between the first holding portion 52 and the second holding portion 54 such that the leader block 40 closes off the opening 26. Because the holding force (i.e., the predetermined pressure mentioned above) for holding the leader block 40 to the upper case 20 and the lower case 30 is effectively ensured due to the elastic force of the connection arm 46, the leader block 40 does not easily come apart from the opening 26 even with the application of shocks due to dropping and the like.

As described above, in the magnetic tape cartridge according to the present invention, an elastic, deformable means for holding and anchoring the leader block 40 is formed at the leader block rather than at the case. In other words, the leader block 40 has elasticity that allows deformation in a direction orthogonal to the heightwise direction of the magnetic tape cartridge 10. Accordingly, if it is not possible to form such means at a case due to frequent design changes or the like, setting or adjustment of forces for holding and pulling-out the leader block 40 can be easily carried out on the leader block side.

Thus, for example, when the magnetic tape cartridge 10 is not in use, the leader block 40 is not easily and improperly removed from the opening 26, whereas, when the magnetic tape cartridge is in use, there is no difficulty in removing the leader block 40 from the opening 26.

In accordance with the present invention, even when case portions in the vicinity of the opening are subjected to improvements and the like, load-balance between a holding force and a pulling-out force with respect to the leader block can be easily maintained by simply adjusting the elastic force of the leader block itself.

What is claimed is:

1. A tape cartridge which is insertable at a tape drive, the drive being provided with a drawing-out member which is operably engageable with the tape cartridge at a time of insertion of the tape cartridge and carrying out at least one of reading and writing of data, the tape cartridge comprising:

a reel on which a recording tape is wound;

a leader block attached to an end of the recording tape;

a case for accommodating the reel having an opening through which the recording tape can be passed; and a leader block receiving portion provided on the case adjacent to the opening and in which the leader block is received;

wherein the leader block is elastically deformable from an undeformed condition to a deformed condition and is capable of being held at the leader block receiving portion by an elastic restoring force of the leader block itself; and wherein the leader block is received by the leader block receiving portion and substantially closes the opening when in the deformed condition.

2. The tape cartridge according to claim 1, wherein the leader block receiving portion includes a first holding portion and a second holding portion, which are disposed opposite to each other, for holding the leader block.

3. The tape cartridge according to claim 2, wherein the leader block includes a first arm to be hooked at the first holding portion, a second arm to be engaged to the second holding portion, and a connection arm elastically connecting the first arm and the second arm.

4. The tape cartridge according to claim 3, wherein the first arm and the second arm are substantially parallel with one another.

5. The tape cartridge according to claim 3, wherein the connection arm presents a circular arc form as viewed in plan view.

6. The tape cartridge according to claim 3, wherein the first arm, the connection arm and the second arm present substantially the mirror image of the shape of a "7", as viewed in plan view.

7. The tape cartridge according to claim 3, wherein the drawing-out member of the tape drive is detachably connectable to the first arm.

8. The tape cartridge according to claim 3, wherein the end of the recording tape is attached to the second arm.

9. The tape cartridge according to claim 2, wherein the first holding portion includes a recessed portion that is formed in the case and the second holding portion includes a protruding portion that extends inward in the case.

10. The tape cartridge according to claim 2, wherein the case is substantially rigid.

11. The tape cartridge according to claim 2, wherein the leader block is more elastically deformable than the case.

12. The tape cartridge according to claim 1, wherein the leader block includes a curved recess portion for drawing-out the recording tape, the curved recessed portion having a substantially semicylindrical form.

13. The tape cartridge according to claim 1, wherein the case comprises an upper case and a lower case.

14. The tape cartridge according to claim 1, wherein the case is substantially rectangular in plan view.

15. The tape cartridge according to claim 1, wherein an opening is formed in the case through which opening the recording tape is pulled out.

16. The tape cartridge according to claim 15, when received in the leader block receiving portion, the leader block substantially closes off the opening of the case.

17. A tape drive into which a tape cartridge is removably inserted and which can carry out at least one of reading and writing of data at a time of insertion of the tape cartridge, the tape drive comprising a drawing-out member for drawing-out a recording tape, the drawing-out member being operably engageable with the tape cartridge, wherein the tape cartridge comprises a reel on which the recording tape is wound, a leader block attached to an end of the recording tape, a case for accommodating the reel having an opening through which the recording tape can be passed, and a leader block receiving portion provided on the case adjacent to the opening and in which the leader block is received, wherein the leader block is elastically deformable from an undeformed condition to a deformed condition and is capable of being held at the leader block receiving portion by an elastic restoring force of the leader block itself, and wherein the leader block is received by the leader block receiving portion and substantially closes the opening when in the deformed condition.

* * * * *